July 22, 1952 — J. R. ESTEY — 2,604,061
ROOF GLAZING
Filed Aug. 9, 1948
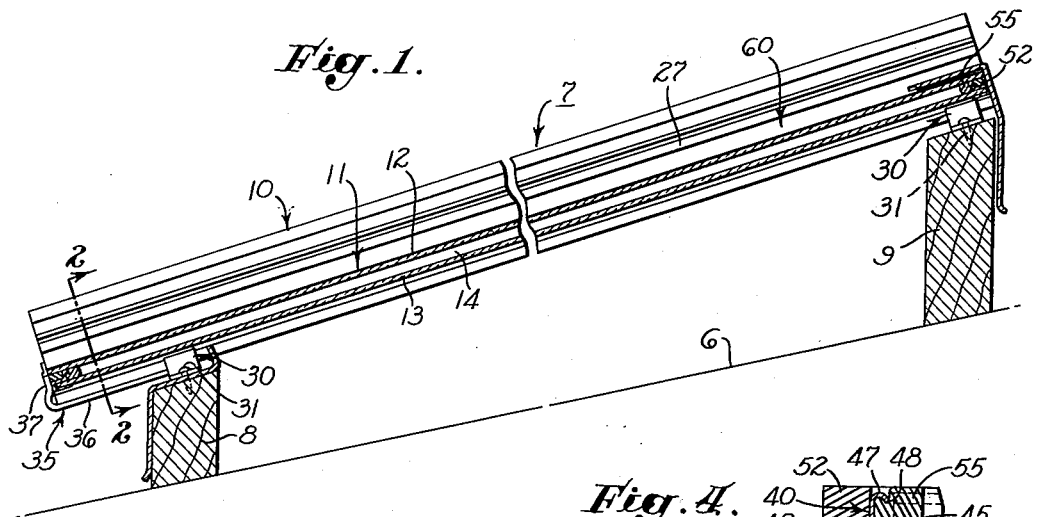
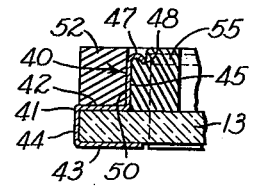
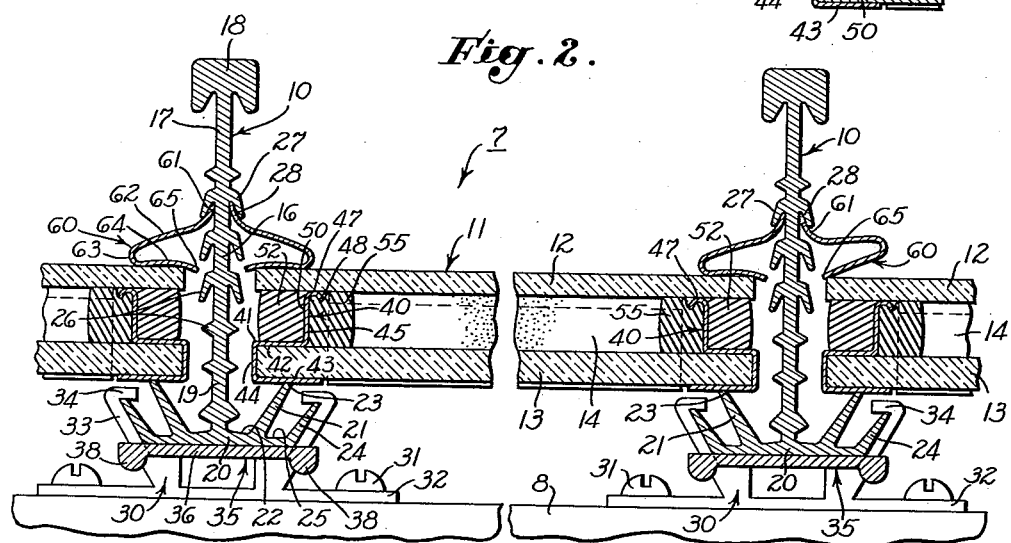
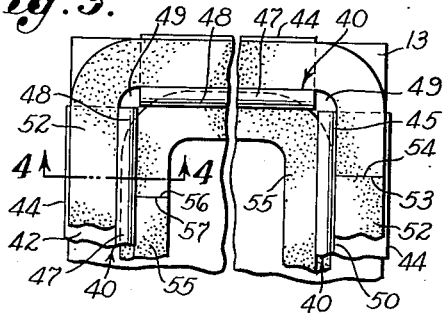
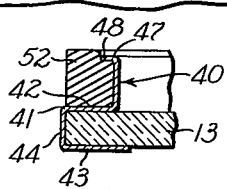
INVENTOR.
J. ROYDEN ESTEY
BY HIS ATTORNEYS.
HARRIS, KIECH, FOSTER & HARRIS Patented July 22, 1952

2,604,061

UNITED STATES PATENT OFFICE 2,604,061

ROOF GLAZING

James Royden Estey, South Pasadena, Calif., assignor to Aluminex Incorporated, Los Angeles, Calif., a corporation of California Application August 9, 1948, Serial No. 43,269

17 Claims. (Cl. 108—16)

My invention relates to glazing and more particularly to a type of double glazing involving the use of two panes of glass, the inter-pane space being effectively sealed. The invention will be particularly exemplified as applied to roof glazing, although it is applicable to other types of glazing, as will be evident to those skilled in the art.

The sealing of an inter-pane space has presented serious problems. Attempts have been made to seal two panes of glass individually to the frame in which they are set. This type of glazing has not been wholly satisfactory, one reason being that heat will expand differentially the glass and the frame, tending to permit entry into the inter-pane space of dust or moisture. More recently, it has been proposed to seal the inter-pane space by a glass-to-glass bond. This provides an effective seal but offers difficulties in manufacturing and transportation, resulting in exceptionally high cost. In addition, breakage of one of the panes requires replacement of the entire sealed unit.

It is an object of the present invention to provide a method and apparatus for double glazing in which the two panes of glass can be effectively and permanently sealed relative to each other during installation.

Another object of the invention is to provide a glazing structure in which the inter-pane space is sealed by a resilient sealing member which preferably extends completely around the periphery of the inter-pane space.

A further object is to provide an arrangement whereby the means for mounting the panes will apply a pressure tending to compress the resilient sealing member.

It is very desirable that the two panes of glass be spaced a definite distance from each other and that this distance should not be determined merely by the compressive force applied to compress the resilient sealing member. It is an object of the present invention to provide such definite spacing. In this connection, the invention includes among its objects the provision of a spacing member serving the dual function of minimizing the distance between the panes and also positioning the resilient sealing member.

A further object of the invention is to employ a plurality of such spacing members disposed near but within the peripheral boundaries of the glass so that one or more sealing members can be wrapped in contact with the spacing members. If two sealing members are employed, to effect a double seal, one can be wrapped outside the spacing members and the other wrapped inside the spacing members. Such spacing members preferably provide ends abutting adjacent and between the ends of a spacing member. If two sealing members are employed, the respective points of abutment are preferably displaced peripherally from each other. The provision of a structure with such relationships is included in the objects of the invention.

A further object is to provide a novel attachment whereby the spacing members can be removably connected to the edge portion of one of the two panes of glass. It is another object to provide a crest on each spacing member to engage the other pane of glass when the sealing member has been properly compressed.

Another object is to provide a glazing structure in which a sealing member can be easily positioned by and adhered to suitable clips or spacing members.

Further objects and advantages of the invention will be evident to those skilled in the art from the following description of exemplary embodiments, illustrated as applied to roof glazing and which will suggest to those skilled in the art other applications of the invention.

Referring to the drawings:

Fig. 1 is a vertical sectional view of the invention as applied to a skylight;

Fig. 2 is a transverse sectional view taken along the line 2—2 of Fig. 1 and showing the double-glazed unit of Fig. 1 in addition to the adjacent ends of two other double-glazed units;

Fig. 3 illustrates one corner of a double-glazed unit with the top pane removed;

Fig. 4 is a fragmentary sectional view taken on the line 4—4 of Fig. 3, showing the double-glazed unit before the upper pane is in place; and Fig. 5 is a sectional view similar to Fig. 4 showing an alternative construction.

Referring particularly to Fig. 1, the numeral 6 indicates a sloping roof line, there being a skylight, indicated generally by the numeral 7, installed above the roof. Wooden supports 8 and 9 are illustrated as supporting the skylight but it should be understood that any conventional support can be employed without departing from the spirit of the invention.

Many advantages accrue from using, as a part of the skylight-supporting means, a plurality of spaced glazing bars 10 extending between the supports 8 and 9 in spaced relationship to support the double-glazed unit of the invention, indicated generally by the numeral 11, and comprising upper and lower panes of glass 12 and 13 spaced from each other to define an inter-pane space 14.

Each glazing bar 10 is shown as including a web 16 having an upper portion 17 terminating in a bead or head 18 and having a lower portion 19 terminating in a base portion 20 having one or more longitudinal abutments or ribs 21 extending upwardly therefrom. Each rib 21 forms, with the lower portion 19 of the web 16, a drainage channel 22 and terminates in a glass-supporting edge 23. Extending upwardly from the base portion 20 beyond the rib 21 is a protective rib or flange 24 cooperating therewith in defining a drainage channel 25. The glazing bar 10 is a girder-like member and additional strength may be imparted by longitudinal enlargements 26 protruding from the web 16. At least one of such enlargements is positioned above the upper pane 12 and comprises an abutment 27 having a downwardly-facing groove 28 for a purpose to be later described. Each glazing bar 10 is preferably an aluminum alloy extrusion, cut to appropriate length.

To hold the glazing bar 10 in position, shoes 30, in bracket-like form, are secured to the supports 8 and 9 by any suitable means such as by screws 31 passing through legs 32 of the shoes. Each shoe includes two diverging arms 33 with inward projections 34, these arms encompassing and retaining the flanges 24 of the glazing bar when this bar is slid longitudinally into the shoes 30 respectively mounted on the supports 8 and 9.

Each of the lowermost shoes 30 is also adapted to receive a glass stop 35, best shown in Figs. 1 and 2. This glass stop is essentially L-shaped to provide a base portion 36 and an upturned end portion 37 which extends across the lowermost end of the double-glazed unit 11. The lowermost edges of the panes 12 and 13 abut against the upturned end portion 37 to retain the unit 11 against downward movement. The base portion 36 of each stop 35 provides enlarged beads 38, best shown in Fig. 2, and is notched at its sides to receive the arms 33 of the shoe 30 and to interlock with the shoe. This interlocking arrangement is not per se a part of the present invention, interlocking structures of this type being shown in the patent to Jack Williams No. 2,178,507 to which reference is made for a more detailed description. Suffice it to say, that the shoe 30 can be moved downwardly between the arms 33 and interlocked therewith against movement longitudinally of the glazing bar, after which the glazing bar can be slid into place, the base portion 36 lying immediately beneath the base portion 20 of the glazing bar 10.

The invention includes a relatively rigid spacing means, preferably in the form of a plurality of spacing members 40 traversing the inter-pane space 14 and including a detachable means for securing the spacing members to one of the panes of glass, preferably the lower pane 13. The latter means preferably clips over a peripheral edge of the lower pane 13.

In the preferred arrangement, each spacing member 40 is formed from sheet material, preferably an aluminum alloy, although it can be an extruded section. If bent from sheet material, each spacing member provides a generally U-shaped clip portion 41 including upper and lower side walls 42 and 43 spaced by an end wall 44 to receive an edge portion of the lower pane 13 in a manner best shown in Fig. 2. The end wall 44 lies along an end face of the pane 13 and the side walls 42 and 43 snugly but removably engage the upper and lower surfaces of the pane 13. The lower side wall 43 preferably extends inwardly of the pane beyond the glass-supporting edge 23 to be engaged by this edge, thus eliminating direct engagement between the rib 21 and the glass and providing additional insurance against breakage of the glass.

This form of spacing member 40 provides a spacing portion 45 traversing the inter-pane space 14 by extending from the inner face of one pane toward the inner face of the other. This support portion should be relatively rigid and preferably should extend from or be bent from the upper side wall 42 near and preferably substantially opposite the glass-supporting edge 23 of the rib 21. The far end of the spacing portion 45 provides a crest 47 for engagement with the inner surface of the upper pane 12. This crest may comprise a bent portion 48 of the spacing portion 45, being preferably a rolled portion extending toward the center of the inter-pane space 14, as suggested in Fig. 2. Alternatively, the bent portion 48 can extend outwardly relative to the inter-pane space 14, as suggested in Fig. 5.

Each spacing member 40 is preferably of a length slightly less than the edge portion of the pane 13 to which it is clipped. The spacing members can be cut to length on the job or in a factory. The invention contemplates that at least two such spacing members shall be employed, extending respectively along those edges of the pane which are supported by the ribs 21. However, it is distinctly preferable to use one spacing member 40 for each peripheral edge of the pane, as illustrated in Figs. 2 and 3, and to cut these spacing members to such length that they enclose the inter-pane space except in corner portions 49, best shown in Fig. 3. It should be understood, however, that a plurality of shorter spacing members can be clipped to the pane along each or any peripheral edge without departing from the spirit of the invention.

In the preferred arrangement, the spacing portions 45 extend directly across the inter-pane space 14 at positions spaced inwardly from the peripheral edge of the pane to which they are connected. By this arrangement there is provided, between the spacing members 40 and the corresponding peripheral edges of the pane, a plurality of peripheral spaces 50 adapted to receive a resilient sealing member 52 of the invention.

The sealing member 52 forms at least a part of a sealing means for effectively sealing the inter-pane 14 against the entry of dust or moisture. The sealing member 52 is preferably a long strip of sponge rubber or other resilient or deformable material which is wrapped in the spaces 50 in contact with the spacing portions 45 to extend completely around the inter-pane space. Such a resilient sealing member 52 provides ends 53 and 54 which preferably abut at a position intermediate the ends of one of the spacing members 40, as suggested in Fig. 3. In effect, the sealing member is wrapped around the spacing members 40 and assumes a natural curve in the corner portions 49, as suggested in Fig. 3.

It is preferable to adhere the resilient sealing member 52 to the spacing members 40 as this facilitates installation and insures that the ends 53 and 54 can lie in abutting relationship. An adhesive can be present on one or the other or both of these members. The preferred arrangement is to employ a sealing member 52 with a coating of adhesive on its inner edge and protected by a strip of fabric which can be stripped off just before the sealing member is wrapped in contact with the spacing members 40. The sealing member is preferably wrapped with the adhesive side in contact with the spacing portion 45.

The normal uncompressed height of the sealing member 52 should be such as to extend beyond the crest 47 when initially installed, as suggested in Fig. 4. When the upper pane 12 is disposed in place and pressed downwardly, the resilient material will be compressed until the crest 47 engages the upper pane, thus slightly spreading the resilient sealing member 52 laterally, as suggested in Fig. 2. Such compression effectively seals the inter-pane space 14 against entry of moisture or dust. The spacing member 40 determines the degree of compression of the sealing member and insures that the panes shall be parallel.

If a double seal is desired, another resilient sealing member 55 can be wrapped interiorly of the spacing portions 45. Its outer and upper peripheral edge can be tucked beneath the bent portion 48 of the spacing member 40, as is also the case concerning the sealing member 52 when used with a spacing member of the type shown in Fig. 5. This tends additionally to retain the inner resilient sealing member 55 in place although, if desired, an adhesive may be employed between the outer face thereof and the spacing portions 45. The inner resilient sealing member 55 provides ends 56 and 57 which are in abutting relationship at a point spaced peripherally from the point of abutment of the ends 53 and 54 of the outer resilient sealing member 52. As best shown in Fig. 3, the ends 56 and 57 are in abutting relationship between the ends of one of the spacing members 40, preferably a spacing member on the opposite side of the double-pane unit 11 from the point of abutment of the ends 53 and 54. As shown in Fig. 3, the inner sealing member 55 need not completely fill the corner space provided adjacent the junction of any two spacing members 40. Rather, it can be wrapped to extend arcuately across this corner space, as suggested.

Such wrapping of either or both of the resilient sealing members 52 or 55 is very advantageous as compared with the use of separate strips which would need be carefully cut in length and poined at the corners in a dust-proof manner. Additionally, the present method of positioning the resilient sealing members is very simple, very effective and permits the use of resilient strips which can be readily procured as an article of commerce.

The invention includes, in certain of its aspects, a means for moving the panes 12 and 13 toward each other, thus compressing the sealing means, and for retaining these panes in such position as to compress the sealing means. In this connection, there are many advantages in employing a clamping member 60 of the general type disposed in the patent to Jack Williams No. 2,171,319. As shown in Fig. 2, each clamping member provides an upwardly curving portion terminating in a tongue 61 adapted to fit into the groove 28 of the abutment member 27 of the glazing bar 10. Each clamping member 60 has a flaring portion 62 ending in a bent portion 63 which supports a glass-engaging portion 64. The glass-engaging portion 64 is preferably concave downwardly and provides an end 65 extending beyond the peripheral edge of the pane 12 and dipping below the plane of the upper surface of this pane to assist in the clamping action and to retain the pane 12 against lateral movement toward and away from the adjacent glazing bar. Such extension of the end 65 beyond the edge of the pane also applies a force tending to press the bent portion 63 against the upper surface of the pane 12. The shape of the groove 28 in the abutment 27 can also be made to aid in this respect. Such a clamping member is not per se a part of the present invention but forms a valuable part of the over-all combination, it being understood, however, that other types of clamping members can be employed to force the pane 12 downwardly and compress the sealing members.

With the arrangement shown, each clamping member 60 is inserted in the position shown to the extreme right in Fig. 2, after which the looped portion is forced manually toward the upper pane 12. This tends to pivot the tongue 61 in the groove 28, permitting the clamping member to snap into place and permitting the tongue 61 to spring upwardly in the groove 28 into the position shown. The clamping members are formed of resilient material, usually a thin aluminum alloy, and can be removed, by upward pressure applied to the looped portions, when it is desired to release the glass.

Assuming that the glazing bars 10 are in position, the operator merely clips the spacing members 40 to the periphery of the pane 13, wraps the sealing members 52 and/or 55 in contact with the spacing members, and places the upper pane 12 in place. The clamping members 60 are then used to force the pane 12 downwardly to compress the sealing means, the pressure on the sealing means being limited or maximized by the engagement between the crests 47 and the upper pane 12. Correspondingly, there is no tendency for the sealing means to compress gradually and progressively during prolonged use, such as might release the clamping members 60 or loosen the upper pane 12.

Additionally, it is an easy matter to disassemble the structure should one of the panes become broken or should it be desired to replace the resilient sealing members. The spacing members and any unbroken pane can be reused.

The invention has other advantages in that conventional glass panes, whether or not internally reinforced, can be employed, thus making for economy. The structure minimizes glass breakage because expansion can readily take place between either pane and the metal structure contacting same, also because the pressure exerted by any such metal structure is distributed rather than concentrated along a single sharp edge. In this latter connection, the lower side member 43 distributes the force applied by the glass-supporting edge 23. The downward pressure applied by the clamping member 60 is distributed between the curved portion 63 and the edge of the pane. Additionally, the downward pressure from the curved portion is applied substantially directly opposite the spacing portion 45 and thence to the substantially opposite rib 21. In this way bending stresses in the glass are minimized.

Various changes can be made without departing from the spirit of the invention and will be apparent to those skilled in the art from the above description of exemplary embodiments.

I claim as my invention:

1. In combination in an apparatus for mounting a pair of panes of glass in spaced relationship to provide a sealed inter-pane space: a plurality of spacing members comprising clip portions receiving and attached to different peripheral portions of one of said panes, each spacing member providing a spacing portion extending across said inter-pane space and having a crest facing the other of said panes; and a resilient sealing member positioned by said spacing members near the peripheral zone of said inter-pane space and extending around the periphery thereof, said sealing member being of an initial height greater than said spacing portion and being compressible to bring into engagement said crest and said other pane when said panes are forced toward each other to compress said sealing member and seal the inter-pane space.

2. A combination as defined in claim 1, in which each clip portion comprises a U-shaped portion providing a pair of side walls spaced by an end wall to provide a space in which is disposed an edge portion of said one pane with said end wall lying along the end face of such edge portion and with said side walls lying along the faces of said one pane near the periphery thereof.

3. A combination as defined in claim 1, in which each spacing member is of a length only slightly less than the peripheral portion to which it is attached, and in which adjacent spacing members provide adjoining ends in a corner zone of the inter-pane space.

4. A combination as defined in claim 1, in which each spacing portion is formed of thin substantially flat sheet material extending substantially transversely across the inter-pane space, and in which said crest comprises a bent portion of said sheet material in contact with said other pane.

5. A combination as defined in claim 4, in which said bent portion extends inwardly in a direction away from the periphery of said one pane.

6. A combination as defined in claim 1, in which said spacing members and said sealing member respectively provide contacting surfaces, and in which at least one of said contacting surfaces carries an adhesive adhering said contacting surfaces to each other.

7. A combination as defined in claim 1, in which said resilient sealing member comprises a single member formed of resilient material and of a length extending completely around the periphery of said inter-pane space, said single member providing ends abutting at a point intermediate the ends of a spacing member.

8. A combination as defined in claim 1, in which said spacing portions extend from one pane toward the other at positions respectively spaced inwardly from the peripheral edges of said one pane, and in which said resilient sealing member is disposed in the space between such peripheral edges and such spacing portions in contact with the latter.

9. In combination in an apparatus for mounting upper and lower panes of glass in spaced relationship to provide a sealed inter-pane space: a plurality of lower supporting members supporting the lower of said panes; a relatively rigid spacing means including detachable means for securing same to one of said panes and including a relatively rigid spacing portion extending from a surface of said one pane toward a surface of the other pane, said spacing portion providing a crest facing said surface of said other pane; a resilient sealing means extending completely around said inter-pane space near the periphery thereof and adjacent said spacing means, said sealing means being of sufficient height when uncompressed to extend a slight distance beyond said crest; and means for pressing said upper pane downwardly toward said lower pane to compress said sealing means until said crest engages said other pane, said last-named means including means for holding said panes with said crest engaging said other pane and with said lower pane supported by said supporting members.

10. A combination as defined in claim 9, in which said detachable means includes clip means engaging the peripheral edge of said one pane, said spacing portion being spaced inwardly from such peripheral edge, said resilient sealing means comprising a resilient sealing member disposed in the space between such peripheral edge and said spacing portion.

11. A combination as defined in claim 9, in which said detachable means includes clip portions respectively engaging peripheral edges of said one pane, and in which each spacing portion is disposed inwardly from its respective peripheral edge of said one pane to provide a sealing space adjacent such peripheral edge and outside said spacing portions, said resilient sealing means comprising a resilient sealing member disposed in said sealing space and providing ends abutting at a point intermediate the ends of one of said spacing portions.

12. In combination in an apparatus for mounting a pair of panes of glass in spaced relationship to provide a sealed inter-pane space: a plurality of spacing members corresponding in number to the peripheral edges of one of said panes, each spacing member being of a length slightly less than the corresponding peripheral edge, each spacing member providing clip means for clipping same to the corresponding peripheral edge of said one pane, the ends of adjacent spacing members lying in adjoining positions when secured in place by said clip means, there being a corner zone adjacent each corner of said pane adjacent the adjoining ends of the corresponding spacing members; a resilient sealing member of an uncompressed height greater than the height of said spacing members and wrapped in contact therewith and extending arcuately through said corner zones, said sealing member providing ends abutting at a point intermediate the ends of one of said spacing members; and means for holding said panes in compressing relationship with said resilient sealing member to compress said sealing member between said panes while said panes are spaced by said spacing members.

13. In combination in an apparatus for mounting a pair of panes of glass in spaced relationship to provide a sealed inter-pane space: a pair of glazing bars each providing an upright web, an upper abutment and a lower abutment, the lower abutments of said glazing bars supporting opposed peripheral portions of one of said panes when this pane is disposed to extend between said upright webs; a pair of relatively rigid spacing members respectively including means for mounting same to extend from said one pane toward the other at positions respectively inside said opposed peripheral portions and respectively substantially opposite said lower abutments; a resilient sealing member wrapped in contact with said spacing members and extending peripherally around said inter-pane space, the height of said sealing member being normally greater than the height of said spacing members and said sealing member being compressible to permit contact between said sealing members and said other pane; and clamping means extending between said upper abutment and said other pane for forcing said other pane toward said one pane to compress said resilient sealing member and peripherally seal said inter-pane space.

14. A combination as defined in claim 13, including additional spacing members extending between said panes in a direction transversely between said glazing bars, all of the spacing members providing crests engaged by said other pane to position and rigidify same when said clamping means forces said other pane into contact with such crests and in compressing relationship with said resilient sealing member.

15. In combination in an apparatus for mounting upper and lower panes of glass in spaced relationship to provide a sealed inter-pane space: a plurality of lower supporting members supporting the lower of said panes; a relatively rigid spacing means including a plurality of spacing members and detachable means for securing same to one of said panes, said detachable means including clip portions respectively carried by said spacing members and engaging respective peripheral edges of said one pane, each spacing member providing a spacing portion extending from a surface of said one pane toward a surface of the other pane to traverse said inter-pane space, each spacing portion having a crest facing said surface of said other pane, each spacing portion being disposed inwardly from its respective peripheral edge of said one pane to provide a sealing space adjacent such peripheral edge and outside said spacing portions; a resilient sealing means comprising a resilient sealing member disposed in said sealing space and extending completely around said inter-pane space, said sealing means being of sufficient height when uncompressed to extend a slight distance beyond said crests; another resilient sealing member disposed immediately inside said spacing portions in contact therewith and positioned thereby, said other resilient sealing member peripherally bounding said inter-pane space; and means for pressing said upper pane downwardly toward said lower pane to compress said sealing means until said crests engage said other pane, said last-named means including means for holding said panes with said crests engaging said other pane and with said lower pane supported by said supporting members.

16. A combination as defined in claim 9 in which said detachable means of said spacing means includes a U-shaped clip means providing upper and lower side walls spaced by an end wall to provide a space receiving the peripheral edge of said one pane and with said end wall lying along the end face of said one pane and with said upper and lower side walls extending respectively along the upper and lower faces of said one pane near the periphery thereof, said spacing portion extending from the upper side wall toward said other pane, said lower side wall extending along said lower face of said one pane to a position between the corresponding supporting member and said lower face of said one pane of glass.

17. In combination in an apparatus for mounting a pair of panes of glass in spaced relationship to provide a sealed inter-pane space: a plurality of spacing members attached to different peripheral edges of one of said panes, each spacing member providing a spacing portion traversing said inter-pane space at a position a short distance inside its respective peripheral edge to provide a sealing space adjacent said peripheral edge and outside said spacing portions, each spacing portion having a crest facing the other of said panes; a resilient sealing member wrapped around said spacing portions and lying in said sealing space; a second resilient sealing member disposed immediately inside said spacing portions in contact therewith and positioned thereby, said second resilient sealing member peripherally bounding said inter-pane space, each of said sealing members being of an initial height greater than said spacing portions and being compressible to bring into engagement said crests and said other pane when said panes are forced toward each other to compress said sealing members and seal the inter-pane space.

J. ROYDEN ESTEY.

REFERENCES CITED

The following references are of record in the file of this patent:

UNITED STATES PATENTS

| Number | Name | Date |
|---|---|---|
| 1,000,413 | Kane | Aug. 15, 1911 |
| 1,129,839 | Baldwin | Mar. 2, 1915 |
| 2,178,507 | Williams | Oct. 31, 1939 |